April 28, 1925.

W. H. HENDRICKS

PAN OR THE LIKE

Filed May 21, 1921

Inventor
William H. Hendricks
By George E. Hall
Atty

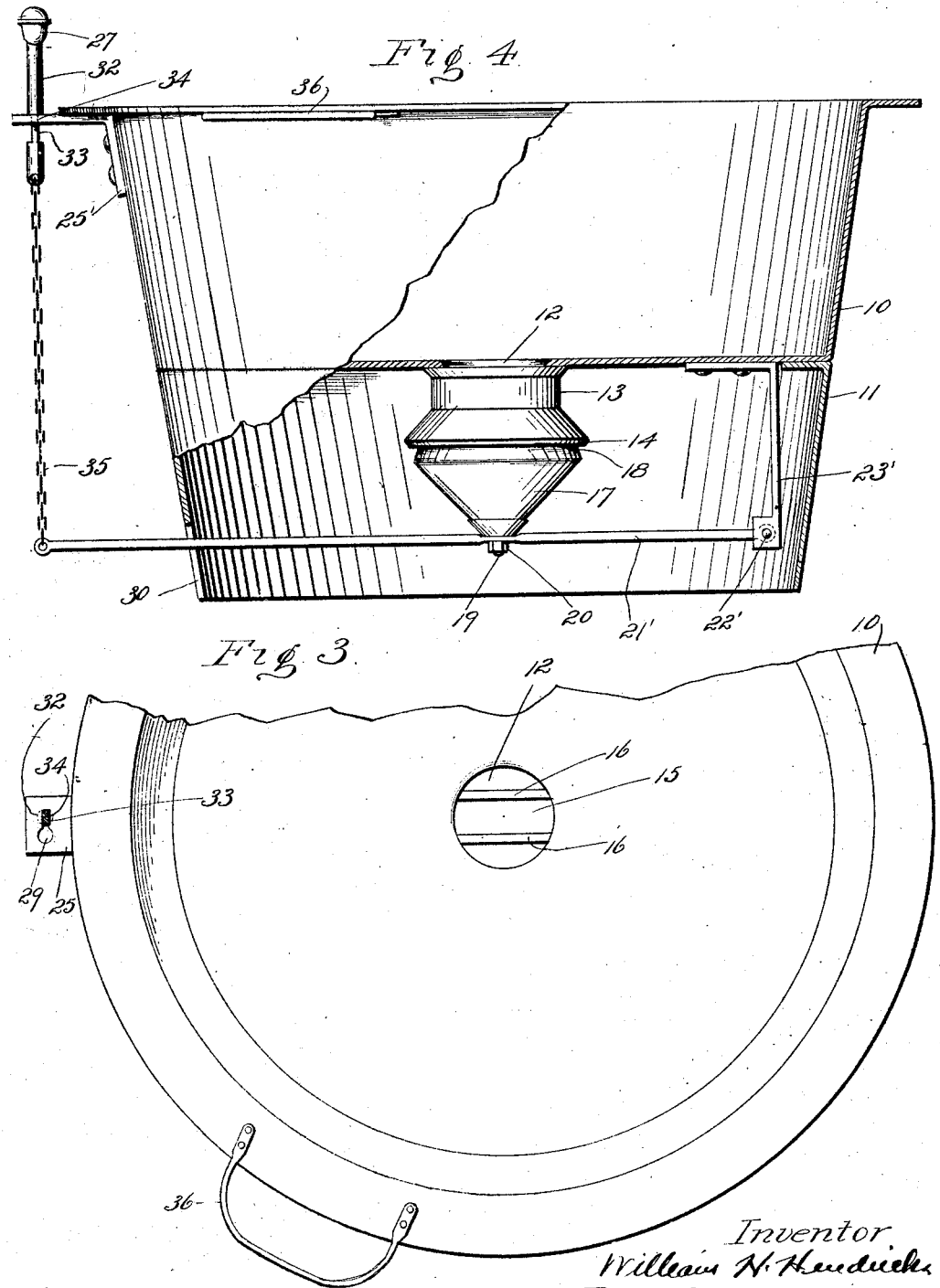

Patented Apr. 28, 1925.

1,535,604

UNITED STATES PATENT OFFICE.

WILLIAM H. HENDRICKS, OF NEW HAVEN, CONNECTICUT.

PAN OR THE LIKE.

Application filed May 21, 1921. Serial No. 471,379.

*To all whom it may concern:*

Be it known that I, WILLIAM H. HENDRICKS, a citizen of the United States, residing at New Haven, in the county of New Haven and State of Connecticut, have invented certain new and useful Improvements in Pans or the like, of which the following is a specification, reference being had therein to the accompanying drawings.

This invention relates to a new and improved pan or the like and it is the principal object thereof to provide means in connection therewith whereby the water may be drained therefrom without pouring it over the edge of the pan.

Among other aims and objects of this invention may be recited the provision of a pan or the like with a valve in the bottom thereof having in view compactness and fewness of parts, simplicity of construction, a low cost of production and maximum efficiency.

The improvements in the details and arrangement of parts will be apparent from an inspection of the accompanying drawings, in connection with the description hereinafter contained and whereby a further embodiment of the invention is disclosed for the purpose of imparting a full understanding of the same.

In the drawings,—

Figure 3 is a plan view; and

Figure 4 is a fragmentary side elevation of a modified form of my invention.

Figure 1:
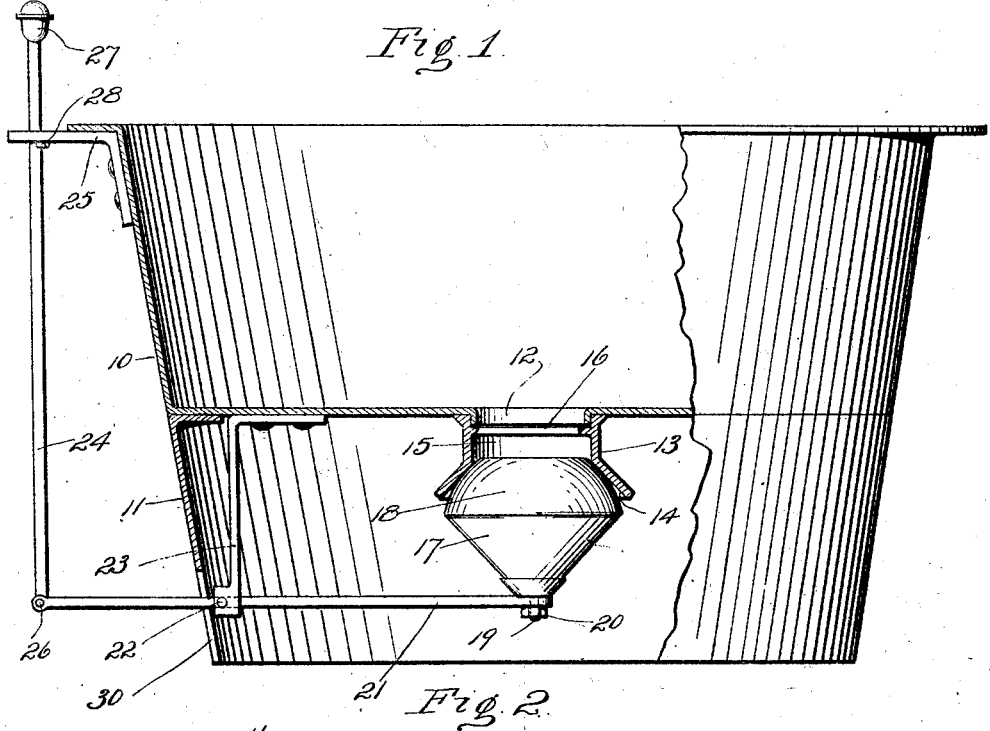
Figure 1 is a fragmentary side elevation of my improved pan.
Figure 2:
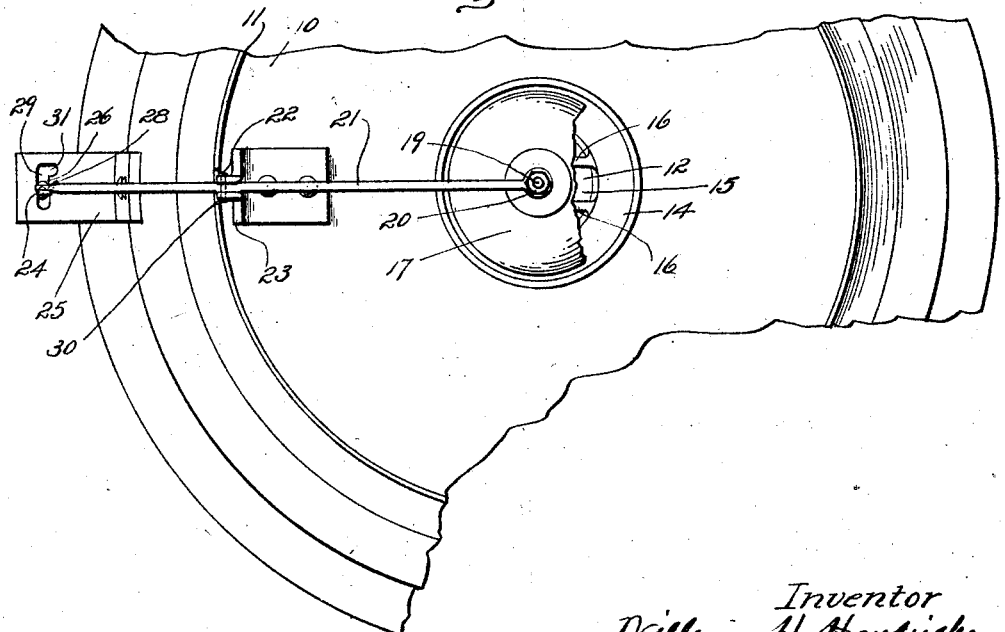
Figure 2 is an underside view thereof.

Having more particular reference to the drawings, in connection with which like reference characters refer to corresponding parts, 10 designates the pan which may be of any form or structure, shown herein as supported by a circular depending skirt or standard 11 and having an opening 12 through the bottom thereof and one or more suitable handles 36 connected therewith.

Secured either by soldering or other similar means, preferably the former, to the bottom of the pan is a valve body 13 having at one end a valve seat 14 and a port 15 therethrough substantially concentric with the opening 12. A suitable screen or strainer 16 is formed integral with the valve body but may be independent thereof, if desired. The screen or strainer is designed to prevent articles of substantial size, such as knives, forks and the like, from entering the valve body.

Operatively mounted so as to be moved onto and off the valve seat 14 is the valve 17 which I have shown herein as being made of rubber having a cylindrical upper portion 18 and secured at its bottom end by a stud 19 and nut 20 to the inner end of a rock lever 21 which is pivotally mounted by the screw or pintle 22 upon the bracket 23 fixed to the bottom of the pan 10, and passes through an opening 30 in the standard 11.

Motion in one direction is imparted to said rock lever from the push rod 24 which passes through a fixed guide plate 25 and is pivotally connected by the pintle or screw 26 with the outer end of the rock lever 21.

A ball or button 27 upon the upper end of the rod 24 provides a convenient surface against which to place the hand while manipulating the push rod. By depressing the push rod, the rock lever 21 is actuated so as to move the valve 17 onto its seat 14 and is then locked in this position by any desired means. The means herein shown consists of a pin 28 which rests against the underside of the guide plate 25 when the push rod is in its down position. The opening 29 in the guide plate through which the rod 24 passes has an offset portion 31 to permit such manipulation.

When the valve is on its seat, the pan may be filled with water. To draw off the water the pin 28 is released from its contact with the underside of the guide plate 25 and the valve 17 drops by gravity off its seat, thus opening the port 15 and the water then will drain therethrough into the standard 11 and from thence through such openings therethrough as may seem convenient or desirable.

In Figure 4 I have shown the bracket 23' as secured upon the side of the valve 17 opposite to that shown in Figure 1 and the rod 32 is much shorter in length than the rod 24, being provided with a flattened portion 33 which is moved into the slot 34 in the guide plate 25' and holds the valve 17 onto its seat. A chain 35 connects the lower end of the rod 32 with the rock lever 21', which lever is pivoted at 22'.

The standard 11 herein is shown as being attached to the underside of the pan and may be provided with openings if desired, or made of wire mesh. In fact any structure that will elevate the pan will operate equally as well as the particular construction herein illustrated.

With my improved device the pan may be filled with dirty dishes, the valve closed and the same given a rough cleansing, after which without removing the dishes from the pan or pouring the water over the edge of the pan as has heretofore been the practice, it is merely necessary to open the valve in the bottom of the pan, allow the dirty water to drain therefrom, then close the valve and complete the cleansing of the dishes with clean water, which can then drain off through the bottom of the pan and the dishes allowed to stand and dry. Thus, in the use of this pan for the purpose just described, it is merely necessary to handle the dishes once instead of many times as heretofore, thereby minimizing the amount of labor involved, as well as the possibility of breakage.

The use of my pan for cleansing fruit, vegetables, or other articles, is equally advantageous.

The method of securing the valve to the rock lever and the mechanism for actuating the same may be varied or changed from that herein shown and described and in these and many other ways the details of my invention may be modified and I would therefore have it understood that I do not limit myself to the exact construction herein shown and described, but claim all that falls fairly within the spirit and scope of the appended claims.

What I claim as new, and desire to secure by Letters Patent, is—

1. In combination with a portable pan having a circular depending supporting skirt, and having a downwardly and outwardly flared valve seat below the pan bottom, an upwardly tapered valve adapted to be engaged in the seat and disposed wholly below the pan bottom and within the skirt so as to be housed by the latter, a horizontal lever disposed beneath the pan bottom and connected to the valve and projecting at its outer end beyond the skirt so as to be partially housed by the skirt, means also housed by the skirt to pivotally support the lever, a guide member on the pan, a vertically movable rod carried by the guide member and disposed exteriorly of the pan and means to connect the outer end of the lever to said rod.

2. In combination with a portable pan having a circular depending supporting skirt, and having a downwardly and outwardly flared valve seat below the pan bottom, an upwardly tapered valve engaged in the seat and disposed wholly below the pan bottom and within the skirt so as to be housed by the latter, a horizontal lever disposed beneath the pan bottom and connected at its inner end to the bottom of the valve and projecting at its outer end beyond the skirt so as to be partially housed by the skirt, a bracket depending from the pan bottom and housed by the skirt, and being pivoted to the lever intermediate the ends of the latter, a guide member on the top of the pan, and a vertically movable rod disposed exteriorly of the pan and carried by the guide member and pivoted at its lower end to the outer end of the lever.

In testimony whereof, I have hereunto affixed my signature.

WILLIAM H. HENDRICKS.